(12) United States Patent
Klemm et al.

(10) Patent No.: US 8,230,193 B2
(45) Date of Patent: Jul. 24, 2012

(54) SYSTEM AND METHOD FOR RAID MANAGEMENT, REALLOCATION, AND RESTRIPING

(75) Inventors: Michael J. Klemm, Minnetonka, MN (US); Michael J. Uttormark, Plymouth, MN (US)

(73) Assignee: Compellent Technologies, Eden Prairie, MN (US)

( * ) Notice: Subject to any disclaimer, the term of this patent is extended or adjusted under 35 U.S.C. 154(b) by 0 days.

(21) Appl. No.: 13/022,074

(22) Filed: Feb. 7, 2011

(65) Prior Publication Data

US 2011/0167219 A1 Jul. 7, 2011

Related U.S. Application Data

(63) Continuation of application No. 11/753,364, filed on May 24, 2007, now Pat. No. 7,886,111.

(60) Provisional application No. 60/808,045, filed on May 24, 2006.

(51) Int. Cl.
*G06F 12/16* (2006.01)
(52) U.S. Cl. .............. 711/165; 711/114; 711/E12.103
(58) Field of Classification Search .............. 711/170, 711/E12.084
See application file for complete search history.

(56) References Cited

U.S. PATENT DOCUMENTS

| | | |
|---|---|---|
| 5,155,835 A | 10/1992 | Belsan |
| 5,274,807 A | 12/1993 | Hoshen et al. |
| 5,331,646 A | 7/1994 | Krueger et al. |
| 5,371,882 A | 12/1994 | Ludlam |
| 5,390,327 A | 2/1995 | Lubbers |
| 5,502,836 A | 3/1996 | Hale et al. |
| 5,572,661 A | 11/1996 | Jacobson |
| 5,613,088 A | 3/1997 | Achiwa et al. |
| 5,644,701 A | 7/1997 | Takewaki |
| 5,659,704 A | 8/1997 | Burkes et al. |
| 5,664,187 A | 9/1997 | Burkes et al. |

(Continued)

FOREIGN PATENT DOCUMENTS

EP 0706113 4/1996

(Continued)

OTHER PUBLICATIONS

Bolosky, W.J., Fitzgerald, Robert P. and Douceur, J.R., "Distributed Schedule Management in the Tiger Video Fileserver", Abstract, 1997, pp. 212-223.

(Continued)

*Primary Examiner* — Edward Dudek, Jr.
*Assistant Examiner* — Ralph A Verderamo, III
(74) *Attorney, Agent, or Firm* — Winthrop & Weinstine, P.A.

(57) ABSTRACT

The present disclosure relates to systems and methods for RAID Restriping. One method includes selecting an initial RAID device for migration based on at least one score, creating an alternate RAID device, moving data from the initial RAID device to the alternate RAID device, and removing the initial RAID device. The method may be performed automatically by the system or manually. The method may be performed periodically, continuously, after every RAID device migration, upon addition of disk drives, and/or before removal of disk drives, etc. One system includes a RAID subsystem and a disk manager configured to automatically calculate a score for each RAID device, select a RAID device based on the relative scores of the RAID devices, create an alternate RAID device, move data from the selected RAID device to the alternate RAID device, and remove the selected RAID device.

20 Claims, 7 Drawing Sheets

U.S. PATENT DOCUMENTS

| | | |
|---|---|---|
| 5,696,934 A | 12/1997 | Jacobson et al. |
| 5,835,953 A | 11/1998 | Ohran |
| 5,897,661 A | 4/1999 | Baranovsky et al. |
| 5,933,834 A | 8/1999 | Aichelen |
| 5,974,515 A | 10/1999 | Bachmat et al. |
| RE36,462 E | 12/1999 | Chang et al. |
| 6,052,759 A | 4/2000 | Stallmo et al. |
| 6,058,489 A | 5/2000 | Schultz et al. |
| 6,070,249 A | 5/2000 | Lee |
| 6,073,218 A | 6/2000 | Dekoning et al. |
| 6,073,221 A | 6/2000 | Beal et al. |
| 6,073,222 A | 6/2000 | Ohran |
| 6,078,932 A | 6/2000 | Haye et al. |
| RE36,846 E | 8/2000 | Ng et al. |
| 6,115,781 A | 9/2000 | Howard |
| 6,115,788 A | 9/2000 | Thowe |
| 6,170,037 B1 | 1/2001 | Blumenau |
| 6,173,361 B1 | 1/2001 | Taketa |
| 6,192,444 B1 | 2/2001 | White et al. |
| 6,212,531 B1 | 4/2001 | Blea et al. |
| 6,215,747 B1 | 4/2001 | Jobs |
| 6,269,431 B1 | 7/2001 | Dunham |
| 6,269,453 B1 | 7/2001 | Krantz |
| 6,275,897 B1 | 8/2001 | Bachmat |
| 6,275,898 B1 | 8/2001 | KeDoning |
| 6,282,671 B1 | 8/2001 | Islam et al. |
| 6,311,251 B1 | 10/2001 | Merritt et al. |
| 6,347,359 B1 | 2/2002 | Smith et al. |
| 6,353,878 B1 | 3/2002 | Dunham |
| 6,356,969 B1 | 3/2002 | DeKoning et al. |
| 6,366,987 B1 | 4/2002 | Tzelnic et al. |
| 6,415,296 B1 | 7/2002 | Challener et al. |
| 6,438,638 B1 | 8/2002 | Jones et al. |
| 6,516,425 B1 | 2/2003 | Belhadj et al. |
| 6,560,615 B1 | 5/2003 | Zayas et al. |
| 6,584,582 B1 | 6/2003 | O'Connor |
| 6,611,897 B2 | 8/2003 | Komachiya et al. |
| 6,618,794 B1 | 9/2003 | Sicola et al. |
| 6,631,493 B2 | 10/2003 | Ottesen et al. |
| 6,636,778 B2 | 10/2003 | Basham et al. |
| 6,718,436 B2 | 4/2004 | Kim et al. |
| 6,732,125 B1 | 5/2004 | Autrey |
| 6,799,258 B1 | 9/2004 | Linde |
| 6,826,711 B2 | 11/2004 | Moulton et al. |
| 6,839,827 B1 | 1/2005 | Beardsley et al. |
| 6,839,864 B2 | 1/2005 | Mambakkam et al. |
| 6,857,057 B2 | 2/2005 | Nelson et al. |
| 6,857,059 B2 | 2/2005 | Karpoff et al. |
| 6,859,882 B2 | 2/2005 | Fung |
| 6,862,609 B2 | 3/2005 | Merkey |
| 6,877,109 B2 | 4/2005 | Delaney et al. |
| 6,883,065 B1 | 4/2005 | Pittlekow et al. |
| 6,904,599 B1 | 6/2005 | Cabrera et al. |
| 6,907,505 B2 | 6/2005 | Cochran et al. |
| 6,912,585 B2 | 6/2005 | Taylor et al. |
| 6,915,241 B2 | 7/2005 | Kohlmorgen et al. |
| 6,915,454 B1 | 7/2005 | Moore et al. |
| 6,938,123 B2 | 8/2005 | Willis et al. |
| 6,948,038 B2 | 9/2005 | Berkowitz et al. |
| 6,952,794 B2 | 10/2005 | Lu |
| 6,957,294 B1 | 10/2005 | Saunders et al. |
| 6,957,362 B2 | 10/2005 | Armangau |
| 6,965,730 B2 * | 11/2005 | Chamberlin et al. ......... 386/293 |
| 6,978,259 B2 | 12/2005 | Anderson |
| 6,981,114 B1 | 12/2005 | Wu et al. |
| 6,996,582 B2 | 2/2006 | Daniels et al. |
| 6,996,741 B1 | 2/2006 | Pittlekow et al. |
| 7,000,069 B2 | 2/2006 | Bruning et al. |
| 7,003,567 B2 | 2/2006 | Suzuki et al. |
| 7,003,688 B1 | 2/2006 | Pittlekow et al. |
| 7,017,076 B2 | 3/2006 | Ohno et al. |
| 7,032,093 B1 | 4/2006 | Cameron |
| 7,032,119 B2 | 4/2006 | Fung |
| 7,039,778 B2 | 5/2006 | Yamasaki |
| 7,043,663 B1 | 5/2006 | Pittlekow et al. |
| 7,047,358 B2 | 5/2006 | Lee et al. |
| 7,051,182 B2 | 5/2006 | Blumenau et al. |
| 7,058,788 B2 | 6/2006 | Niles et al. |
| 7,058,826 B2 | 6/2006 | Fung |
| 7,069,468 B1 | 6/2006 | Olson et al. |
| 7,072,916 B1 | 7/2006 | Lewis et al. |
| 7,085,899 B2 | 8/2006 | Kim et al. |
| 7,085,956 B2 | 8/2006 | Petersen et al. |
| 7,089,395 B2 | 8/2006 | Jacobson et al. |
| 7,093,158 B2 | 8/2006 | Barron et al. |
| 7,093,161 B1 | 8/2006 | Mambakkam et al. |
| 7,100,080 B2 | 8/2006 | Howe |
| 7,103,740 B1 | 9/2006 | Colgrove et al. |
| 7,103,798 B2 | 9/2006 | Morita |
| 7,107,417 B2 | 9/2006 | Gibble et al. |
| 7,111,147 B1 | 9/2006 | Strange et al. |
| 7,124,272 B1 | 10/2006 | Kennedy et al. |
| 7,127,633 B1 | 10/2006 | Olson et al. |
| 7,133,884 B1 | 11/2006 | Murley et al. |
| 7,134,011 B2 | 11/2006 | Fung |
| 7,134,053 B1 | 11/2006 | Moore |
| 7,162,587 B2 | 1/2007 | Hiken et al. |
| 7,162,599 B2 | 1/2007 | Berkowitz et al. |
| 7,181,581 B2 | 2/2007 | Burkey |
| 7,184,933 B2 | 2/2007 | Prekeges et al. |
| 7,191,304 B1 | 3/2007 | Cameron et al. |
| 7,194,653 B1 | 3/2007 | Hadders et al. |
| 7,197,614 B2 | 3/2007 | Nowakowski |
| 7,216,258 B2 | 5/2007 | Ebsen et al. |
| 7,222,205 B2 | 5/2007 | Jones et al. |
| 7,225,317 B1 | 5/2007 | Glade et al. |
| 7,228,441 B2 | 6/2007 | Fung |
| 7,237,129 B2 | 6/2007 | Fung |
| 7,251,713 B1 | 7/2007 | Zhang |
| 7,272,666 B2 | 9/2007 | Rowan et al. |
| 7,272,735 B2 | 9/2007 | Fung |
| 7,281,106 B1 * | 10/2007 | Arnan et al. .................. 711/165 |
| 7,293,196 B2 | 11/2007 | Hiken et al. |
| 7,305,536 B2 * | 12/2007 | Tabata et al. .................. 711/165 |
| 7,305,579 B2 | 12/2007 | Williams |
| 7,320,052 B2 | 1/2008 | Zimmer et al. |
| 7,380,113 B2 | 5/2008 | Ebsen et al. |
| 7,406,631 B2 | 7/2008 | Moore |
| 7,484,111 B2 | 1/2009 | Fung |
| 7,512,822 B2 | 3/2009 | Fung |
| 7,533,283 B2 | 5/2009 | Fung |
| 7,552,350 B2 | 6/2009 | Fung |
| 7,558,976 B2 | 7/2009 | Fung |
| 7,562,239 B2 | 7/2009 | Fung |
| 7,603,532 B2 | 10/2009 | Rajan et al. |
| 7,672,226 B2 | 3/2010 | Shea |
| 7,702,948 B1 | 4/2010 | Kalman et al. |
| 7,886,111 B2 * | 2/2011 | Klemm et al. ................ 711/114 |
| 2001/0020282 A1 | 9/2001 | Murotani et al. |
| 2002/0004912 A1 | 1/2002 | Fung |
| 2002/0004913 A1 | 1/2002 | Fung |
| 2002/0004915 A1 | 1/2002 | Fung |
| 2002/0007438 A1 | 1/2002 | Lee |
| 2002/0007463 A1 | 1/2002 | Fung |
| 2002/0007464 A1 | 1/2002 | Fung |
| 2002/0046320 A1 | 4/2002 | Shaath |
| 2002/0062454 A1 | 5/2002 | Fung |
| 2002/0073278 A1 | 6/2002 | McDowell |
| 2002/0095546 A1 | 7/2002 | Dimitri et al. |
| 2002/0103969 A1 | 8/2002 | Koizumi et al. |
| 2002/0112113 A1 | 8/2002 | Karpoff et al. |
| 2002/0129214 A1 | 9/2002 | Sarkar |
| 2002/0186492 A1 | 12/2002 | Smith |
| 2003/0005248 A1 | 1/2003 | Selkirk et al. |
| 2003/0033577 A1 | 2/2003 | Anderson |
| 2003/0046270 A1 | 3/2003 | Leung et al. |
| 2003/0065901 A1 | 4/2003 | Krishnamurthy |
| 2003/0110263 A1 | 6/2003 | Shillo |
| 2003/0182503 A1 | 9/2003 | Leong et al. |
| 2003/0188097 A1 | 10/2003 | Holland et al. |
| 2003/0188208 A1 | 10/2003 | Fung |
| 2003/0200473 A1 | 10/2003 | Fung |
| 2003/0212865 A1 | 11/2003 | Hiken et al. |
| 2003/0212872 A1 | 11/2003 | Patterson et al. |
| 2003/0221060 A1 | 11/2003 | Umberger et al. |
| 2003/0231529 A1 | 12/2003 | Hetrick et al. |
| 2004/0015655 A1 | 1/2004 | Willis et al. |

| | | | |
|---|---|---|---|
| 2004/0030822 A1 | 2/2004 | Rajan et al. | |
| 2004/0030951 A1 | 2/2004 | Armangau | |
| 2004/0073747 A1 | 4/2004 | Lu | |
| 2004/0088505 A1 | 5/2004 | Watanabe | |
| 2004/0107222 A1 | 6/2004 | Venkatesh et al. | |
| 2004/0111558 A1 | 6/2004 | Kistler et al. | |
| 2004/0117572 A1 | 6/2004 | Welsh et al. | |
| 2004/0133742 A1 | 7/2004 | Vasudevan et al. | |
| 2004/0163009 A1 | 8/2004 | Goldstein et al. | |
| 2004/0172577 A1 | 9/2004 | Tan et al. | |
| 2004/0236772 A1* | 11/2004 | Arakawa et al. | 707/100 |
| 2005/0010618 A1 | 1/2005 | Hayden | |
| 2005/0010731 A1 | 1/2005 | Zalewski et al. | |
| 2005/0027938 A1 | 2/2005 | Burkey | |
| 2005/0055603 A1 | 3/2005 | Soran et al. | |
| 2005/0065962 A1 | 3/2005 | Rowan et al. | |
| 2005/0081086 A1 | 4/2005 | Williams | |
| 2005/0108582 A1 | 5/2005 | Fung | |
| 2005/0114350 A1 | 5/2005 | Rose et al. | |
| 2005/0144512 A1 | 6/2005 | Ming | |
| 2005/0154852 A1* | 7/2005 | Nakagawa et al. | 711/170 |
| 2005/0166085 A1 | 7/2005 | Thompson et al. | |
| 2005/0182992 A1 | 8/2005 | Land et al. | |
| 2005/0193058 A1 | 9/2005 | Yasuda et al. | |
| 2005/0262325 A1 | 11/2005 | Shmueli et al. | |
| 2006/0031287 A1 | 2/2006 | Ulrich | |
| 2006/0041718 A1 | 2/2006 | Ulrich et al. | |
| 2006/0059306 A1 | 3/2006 | Tseng | |
| 2006/0093282 A1 | 5/2006 | Shepherd et al. | |
| 2006/0107097 A1 | 5/2006 | Zohar et al. | |
| 2006/0161752 A1 | 7/2006 | Burkey | |
| 2006/0161808 A1 | 7/2006 | Burkey | |
| 2006/0179218 A1 | 8/2006 | Burkey | |
| 2006/0184821 A1 | 8/2006 | Hitz et al. | |
| 2006/0206536 A1 | 9/2006 | Sawdon et al. | |
| 2006/0206665 A1 | 9/2006 | Orsley | |
| 2006/0206675 A1 | 9/2006 | Sato et al. | |
| 2006/0218360 A1 | 9/2006 | Burkey | |
| 2006/0218367 A1 | 9/2006 | Ukai et al. | |
| 2006/0218433 A1 | 9/2006 | Williams | |
| 2006/0230244 A1 | 10/2006 | Amarendran et al. | |
| 2006/0248324 A1 | 11/2006 | Fung | |
| 2006/0248325 A1 | 11/2006 | Fung | |
| 2006/0248358 A1 | 11/2006 | Fung | |
| 2006/0248359 A1 | 11/2006 | Fung | |
| 2006/0248360 A1 | 11/2006 | Fung | |
| 2006/0248361 A1 | 11/2006 | Fung | |
| 2006/0248379 A1 | 11/2006 | Jernigan, IV | |
| 2006/0253669 A1 | 11/2006 | Lobdell | |
| 2006/0253717 A1 | 11/2006 | Fung | |
| 2006/0259797 A1 | 11/2006 | Fung | |
| 2006/0265608 A1 | 11/2006 | Fung | |
| 2006/0265609 A1 | 11/2006 | Fung | |
| 2006/0271604 A1 | 11/2006 | Shoens | |
| 2006/0277361 A1 | 12/2006 | Sharma et al. | |
| 2006/0277432 A1 | 12/2006 | Patel et al. | |
| 2007/0005885 A1 | 1/2007 | Kobayashi et al. | |
| 2007/0011425 A1 | 1/2007 | Sicola | |
| 2007/0016749 A1 | 1/2007 | Nakamura et al. | |
| 2007/0016754 A1 | 1/2007 | Testardi | |
| 2007/0101173 A1 | 5/2007 | Fung | |
| 2007/0168709 A1 | 7/2007 | Morita | |
| 2007/0180306 A1 | 8/2007 | Soran et al. | |
| 2007/0220313 A1 | 9/2007 | Katsuragi et al. | |
| 2007/0240006 A1 | 10/2007 | Fung | |
| 2007/0245084 A1 | 10/2007 | Yagisawa et al. | |
| 2007/0245165 A1 | 10/2007 | Fung | |
| 2007/0260830 A1 | 11/2007 | Faibish et al. | |
| 2007/0266066 A1 | 11/2007 | Kapoor et al. | |
| 2007/0288401 A1 | 12/2007 | Hood et al. | |
| 2008/0005468 A1 | 1/2008 | Faibish et al. | |
| 2008/0288546 A1 | 11/2008 | Adkins et al. | |
| 2009/0235104 A1 | 9/2009 | Fung | |

FOREIGN PATENT DOCUMENTS

| | | |
|---|---|---|
| EP | 0 757 317 A2 | 2/1997 |
| EP | 0780758 | 6/1997 |
| EP | 1 462 927 A2 | 9/2004 |
| EP | 1 635 252 | 3/2006 |
| JP | 3-259320 | 11/1991 |
| JP | 7200367 | 8/1995 |
| JP | 8-44503 | 2/1996 |
| JP | 08115173 A | 5/1996 |
| JP | 8-278850 | 10/1996 |
| JP | 9-128305 | 5/1997 |
| JP | 2001-147785 | 5/2001 |
| JP | 2001-337850 | 12/2001 |
| JP | 2001-344139 | 12/2001 |
| JP | 2002182859 A | 6/2002 |
| JP | 2002-278819 | 9/2002 |
| JP | 2003-50724 | 2/2003 |
| JP | 2005-512191 | 4/2005 |
| JP | 2005149274 A | 6/2005 |
| JP | 2005332123 A | 12/2005 |
| WO | WO 00/13077 | 3/2000 |
| WO | WO 02/25445 | 3/2002 |
| WO | WO 03/048941 | 6/2003 |
| WO | WO 2005017737 | 2/2005 |

OTHER PUBLICATIONS

Cheung, L. "Design and Optimization of Distributed RAID Storage System", Research Paper, CS444 Section A, Fall 2002, 15pp.

Scheuermann, P., Weikum, G., Zabback P., "Data Partitioning and load balancing in parallel disk systems", Copyright Springer-Verlug 1998, 19 pp.

Schomaker, G., "DHHT-RAID: A Distributed Heterogenous Scalable Architecture for Dynamic Storage Environments", 21st International Conferenced on Advanced Networking and Applications (AINA'07), Copyright 2007, 9 pp.

Jin, H., Zhou, X., Feng, D., Zhang, J., "Improving Partial Stripe Write Performance in Raid Level 5", Department of Computer Science and Technology, Huazong University of Science and Technology, Wuhan, 430074, P.R. China, Copyright 1999, pp. 396-400.

The PC Guide "RAID Level 7", 2001, http://www.pcguide.com/ref/hdd/perf/raid/levels/singleLevel7-c.html.

"The Compaq Enterprise Network Storage Architecture: An Overview", source(s): Compaq, May 2000, pp. 1-22.

Massiglia, P., "Chapter 11: Dynamic Data Mapping", The RAIDbook. A Source for RAID Technology, Feb. 1997; pp. 197-208.

Wilkes, John, et al., "The HP AutoRAID Hierarchical Storage System", ACM Transactions on Computer Systems, Association for Computing Machinery, ACM Transactions on Computer Systems, vol. 14, No. 1, Feb. 1996; pp. 108-136.

Hwang, K. et al., "Orthogonal Striping and Mirroring in Distributed RAID for I/O-Centric Cluster Computing", *IEEE Transactions on Parallel and Distributed Systems*, vol. 13, No. 1 Jan. 2002, 26-44.

Menon, J. et al., "Algorithms for Software and Low-Cost Hardware RAIDs", *IBM Almaden Research Center*, menonjm@almaden.ibm.com 1995 , 411-418.

Thomasian, A. et al., "A Performance Evaluation Tool for RAID Disk Arrays", *New Jersey Institute of Technology—NJIT, Preceedings of the First International Conference on the Quantitative Evaluation of Systems* 2004 , 10pp.

Wilkes, J. et al., "The HP AutoRAID Hierarchical Storage System", *ACM Transactions on Computer Systems*, vol. 14, No. 1 Feb. 1996 , 108-136.

Zadok, E. et al., "Reducing Storage Management Costs via Informed User-Based Policies", *Technical Report* FSL-03-01 Aug. 14, 2003 , 26pp.

Niki C. Thornock, Xiao-Hong Tu, and J. Kelly Flanagan. 1997. A stochastic disk I/O simulation technique. In Proceedings of the 29th conference on Winter simulation (WSC'97). IEEE Computer Society, Washington, DC, USA 1079-1086.

PCGuide article Logical Block Addressing [online]. 2001 [retrieved on Jul. 21, 2011]. Retrieved from the Internet: <http://www.pcguide.com/ref/hdd/bios/modesLBA-c.html>.

Vongsathorn, P. and Carson, S. D. (1990). A system for adaptive disk rearrangement. Software: Practice and Experience, 20:225-242.

Sedat Akyurek and Kenneth Salem. 1995. Adaptive block rearrangement. ACM Trans. Comput. Syst. 13, 2 (May 1995) 89-121.

Sarhan, N. J.; Das, C. R.: "Adaptive block rearrangement algorithms for video-on-demand servers," Parallel Processing, International Conference on, 2001, pp. 452-459, Sep. 3-7, 2001 doi: 10.1109/ICPP.

2001.952092 URL: <http://ieeexplore.ieee.org/stamp/stamp.jsp?tp=&arnumber=952092&isnumber=20585.

Robert Geist, Darrell Suggs, Robert Reynolds, Shardul Divatia, Fred Harris, Evan Foster, and Priyadarshan Kolte. 1992. Disk performance enhancement through Markov-based cylinder remapping. In Proceedings of the 30$^{th}$ annual Southeast regional conference (ACM-SE 30). ACM, New York, NY, USA 23-28.

Athena Vakali, Yannis Manolopoulos Data placement schemes in replicated mirrored disk system, Journal of System and Software, vol. 55, Issue 2, Dec. 27, 2000, pp. 115-128, ISSN 0164-1212, DOI: 10.1016/S0164-1212(00)00065.0. <http://www.sciencedirect.com/science/article/pii/S0164120000650>.

* cited by examiner

SYSTEM AND METHOD FOR RAID MANAGEMENT, REALLOCATION, AND RESTRIPING

CROSS-REFERENCE TO RELATED APPLICATION(S)

This application is a continuation of U.S. patent application Ser. No. 11/753,364, filed May 24, 2007, now U.S. Pat. No. 7,886,111 which claims priority to U.S. provisional patent application Ser. No. 60/808,045, filed May 24, 2006, the entire contents of both of which are incorporated herein by reference in their entirety.

FIELD OF THE INVENTION

The present invention relates generally to disk drive systems and methods, and more particularly to disk drive systems and methods having a dynamic block architecture RAID Device Management, Reallocation, and Restriping for optimizing RAID Device layout when changes to RAID parameters or disk configuration occur.

BACKGROUND OF THE INVENTION

Existing disk drive systems have been designed in such a way that a Virtual Volume is distributed (or mapped) across the physical disks in a manner which is determined at volume creation time and remains static throughout the lifetime of the Virtual Volume. That is, the disk drive systems statically allocate data based on the specific location and size of the virtual volume of data storage space. Should the Virtual Volume prove inadequate for the desired data storage purposes, the existent systems require the creation of a new Virtual Volume and the concomitant copying of previously stored data from the old Virtual Volume to the new in order to change volume characteristics. This procedure is time consuming and expensive since it requires duplicate physical disk drive space.

These prior art disk drive systems need to know, monitor, and control the exact location and size of the Virtual Volume of data storage space in order to store data. In addition, the systems often need larger data storage space, whereby more RAID Devices are added. As a result, emptied data storage space is not used, and extra data storage devices, e.g. RAID Devices, are acquired in advance for storing, reading/writing, and/or recovering data in the system. Additional RAID Devices are expensive and not required until extra data storage space is actually needed.

Therefore, there is a need for improved disk drive systems and methods, and more particularly a need for efficient, dynamic RAID space and time management systems. There is a further need for improved disk drive systems and methods for allowing RAID management, reallocation, and restriping to occur without loss of server or host data access or compromised resiliency.

BRIEF SUMMARY OF THE INVENTION

The present invention, in one embodiment, is a method of RAID Restriping in a disk drive system. The method includes selecting an initial RAID device for migration based on at least one score, creating an alternate RAID device, moving data stored at the initial RAID device to the alternate RAID device; and removing the initial RAID device. The scores may include an initial score, a replacement score, and an overlay score. Furthermore, the method may be performed automatically by the system or manually, such as by a system administrator. The method may be performed periodically, continuously, after every RAID device migration, upon addition of disk drives, and/or before removal of disk drives.

The present invention, in another embodiment, is a disk drive system having a RAID subsystem and a disk manager. The disk manager is configured to automatically calculate a score for each RAID device of the RAID subsystem, select a RAID device from the subsystem based on the relative scores of the RAID devices, create an alternate RAID device, move a portion of the data stored at the selected RAID device to the alternate RAID device, and remove the selected RAID device.

The present invention, in yet another embodiment, is a disk drive system including means for selecting a RAID device for migration based on at least one score calculated for each RAID device, means for creating at least one alternate RAID device, means for moving data stored at the selected RAID device to the at least one alternate RAID device, and means for removing the selected RAID device.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

DETAILED DESCRIPTION

Various embodiments of the present invention relate generally to disk drive systems and methods, and more particularly to disk drive systems and methods which implement one or more Virtual Volumes spread across one or more RAID Devices, which in turn are constructed upon a set of disk drives. RAID Device Management, Reallocation, and Restriping ("Restriping") provides a system and method for changing the various properties associated with a Virtual Volume such as size, data protection level, relative cost, access speed, etc. This system and method may be initiated by administration action or automatically when changes to the disk configuration occur.

The various embodiments of the present disclosure provide improved disk drive systems having a dynamic block architecture RAID Device Restriping that may optimize RAID Device layout when changes to RAID parameters or disk configuration occur. In one embodiment, the layout of RAID Devices may be primarily rebalanced when disks are added to the system. By rebalancing, virtualization performance may be improved within the system by using the maximum available disk configuration. Restriping also may provide the capability to migrate data away from a group of disks, allowing those disks to be removed from the system without loss of uptime or data protection. Further, Restriping may provide the capability to change RAID parameters giving the user the ability to tune the performance and/or storage capacity even after the data has been written. Restriping additionally may provide an improved disk drive system and method for allowing Restriping to occur without loss of server or host data access or compromised resiliency.

Various embodiments described herein improve on the existent disk drive systems in multiple ways. In one embodiment, the mapping between a Virtual Volume and the physical disk drive space may be mutable on a fine scale. In another embodiment, previously stored data may be migrated automatically in small units, and the appropriate mappings may be updated without the need for an entire duplication of physical resources. In a further embodiment, portions of a Virtual Volume which are already mapped to appropriate resources need not be migrated, reducing the time needed for reconfiguration of a Volume. In yet another embodiment, the storage system can automatically reconfigure entire groups of Virtual Volumes in parallel. Additionally, the storage system may automatically reconfigure Virtual Volumes when changes to the physical resources occur. Other advantages over prior disk drive systems will be recognized by those skilled in the art and are not limited to those listed.

Furthermore, Restriping and disk categorization may be powerful tools for administrative control of the storage system. Disk drives which, for example, are found to be from a defective manufacturing lot, may be recategorized so that migration away from these disk drives occurs. Similarly, a set of drives may be held in a "reserve" category, and later recategorized to become part of a larger in-use group. Restriping to widen the RAID Devices may gradually incorporate these additional reserve units. It is noted that several benefits may be recognized by the embodiments described herein, and the previous list of examples is not exhaustive and not limiting.

For the purposes of describing the various embodiments herein, a "Volume" may include an externally accessible container for storing computer data. In one embodiment, a container may be presented via the interconnect protocol as a contiguous array of blocks. In a further embodiment, each block may have a fixed size—traditionally 512 bytes. Although, other sized blocks may be used, such as 256, 1,024, etc. bytes. Typically, supported operations performed on data at any given location may include 'write' (store) and 'read' (retrieve). Although, other operations, such as 'verify' may also be supported. The interconnect protocol used to access Volumes may be the same as that used to access disk drives. Thus, in some embodiments, a Volume may appear and function generally identical to that of a disk drive. Volumes traditionally may be implemented as partitions of a disk drive or simple concatenations of disk drives within an array.

A "Virtual Volume," as used herein, may include an externally accessible container for storing data which is constructed from a variety of hardware and software resources and generally may mimic the behavior of a traditional Volume. In particular, a system containing a disk drive array may present multiple Virtual Volumes which utilize non-intersecting portions of the disk array. In this type of system, the storage resources of the individual disk drives may be aggregated in an array, and subsequently partitioned into individual Volumes for use by external computers. In some embodiments, the external computers may be servers, hosts, etc.

A "RAID Device," as used herein, may include an aggregation of disk partitions which provides concatenation and resiliency to disk drive failure. The RAID algorithms for concatenation and resiliency are well known and include such RAID levels as RAID 0, RAID 1, RAID 0+1, RAID 5, RAID 10, etc. In a given disk array, multiple RAID Devices may reside on any given set of disks. Each of these RAID Devices may employ a different RAID level, have different parameters, such as stripe size, may be spread across the individual disk drives in a different order, may occupy a different subset of the disk drives, etc. A RAID Device may be an internally accessible Virtual Volume. It may provide a contiguous array of data storage locations of a fixed size. The particular RAID parameters determine the mapping between RAID Device addresses and the data storage addresses on the disk drives. In the present disclosure, systems and methods for constructing and modifying externally accessible Virtual Volumes from RAID Devices are described that provide the improved functionality.

Virtual Volume Construction

A storage system which utilizes the present disclosure may initially construct a set of RAID Devices having various characteristics on a disk array. The RAID Devices may be logically divided into units referred to herein as "pages," which may be many blocks in size. A typical page size may be 4,096 blocks. Although, in principle any page size from 1 block onwards could be used. However, page sizes generally comprise block numbers in the power of 2. These pages may be managed by Virtual Volume management software. Initially, all the pages from each RAID Device may be marked as free. Pages may be dynamically allocated to Virtual Volumes on an as-needed basis. That is, pages may be allocated when it is determined that a given address is first written. Addresses that are read before being written can be given a default data value. The Virtual Volume management software may maintain the mapping between Virtual Volume addresses and pages within the RAID Devices. It is noted that a given Virtual Volume may be constructed of pages from multiple RAID Devices, which may further have differing properties.

Extending the size of a Virtual Volume constructed in this manner may be accomplished by increasing the range of addresses presented to the server. The address-to-page mapping may continue with the same allocate-on-write strategy in both the previously available and extended address ranges.

The performance and resiliency properties of a given Virtual Volume may be determined in large part by the aggregate behavior of the pages allocated to that Virtual Volume. The pages inherit their properties from the RAID Device and physical disk drives on which they are constructed. Thus, in one embodiment, page migration between RAID Devices may occur in order to modify properties of a Virtual Volume, other than size. "Migration," as used herein, may include allocating a new page, copying the previously written data from the old page to the new, updating the Virtual Volume mapping, and marking the old page as free. Traditionally, it may not be possible to convert the RAID Device properties (i.e., remap to a new RAID level, stripe size, etc.) and simultaneously leave the data in place.

There are several independent parameters which may be modified to produce different Virtual Volume properties. Several of the scenarios are outlined in detail herein. However, the scenarios described in detail herein are exemplary of various embodiments of the present disclosure and are not limiting. The present disclosure, in some embodiments, may include simultaneous modification of any or all of these parameters.

RAID Parameter Modification

Figure 1A:
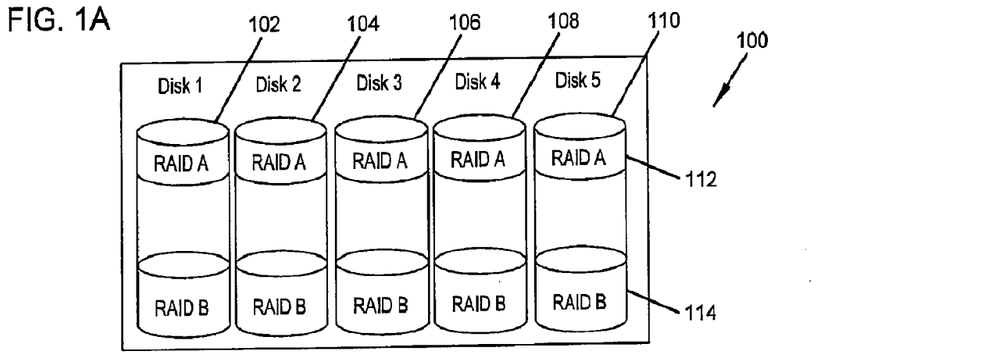
FIG. 1A is a disk array having a RAID configuration in accordance with one embodiment of the present invention.

For purposes of illustration, a disk array 100 containing five disks 102, 104, 106, 108, 110 is shown in FIG. 1A. It is recognized that any number of disks may be used in accordance with the various embodiments disclosed herein, and an exemplary five disk system has been randomly chosen for purposes of describing one embodiment. Initially, two RAID Devices, e.g., RAID Devices A 112 and B 114, may be constructed upon a disk array. The remaining space, if any, may be unallocated and unused. Again, it is recognized that any number of RAID Devices may be used in accordance with the various embodiments disclosed herein, and an exemplary two RAID Devices have been randomly chosen for purposes of describing one embodiment. Multiple Virtual Volumes may be constructed from the pages contained in the RAID Devices. If it is desired that the properties of a given Virtual Volume be modified, additional RAID Devices may be constructed in the remaining space and the appropriate pages migrated, as described previously.

Figure 1B:
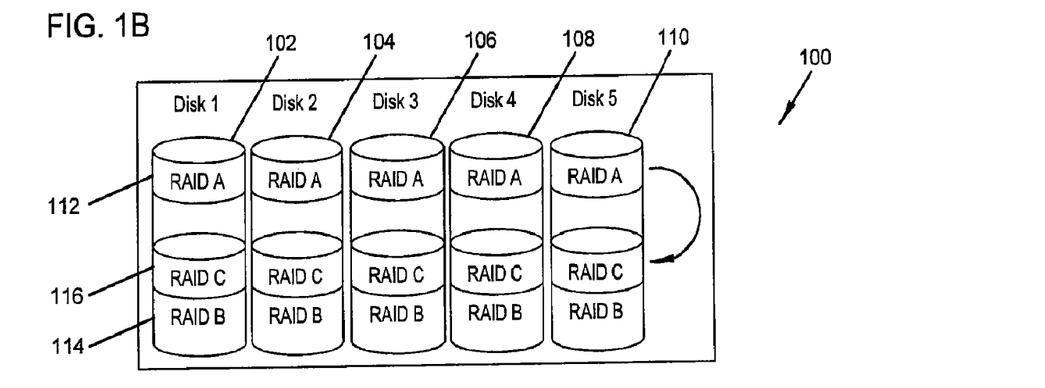
FIG. 1B is the disk array of FIG. 1A having an additional RAID Device.

FIG. 1B depicts an embodiment of a RAID configuration after creating a new RAID Device, e.g., RAID Device C 116, and shows the migration of data from RAID Device A 112. RAID Device C 116 may differ from RAID Device A 112 in RAID level, stripe size, or other RAID parameter, etc. In some embodiments, there may be potential for improved performance by simply relocating to a RAID Device with the same parameters but a different location on the disk drives. For example, the performance of a disk drive may vary from the inside to the outside of the physical platter, and the time for head seeking may be reduced if all data is densely located.

Figure 1C:
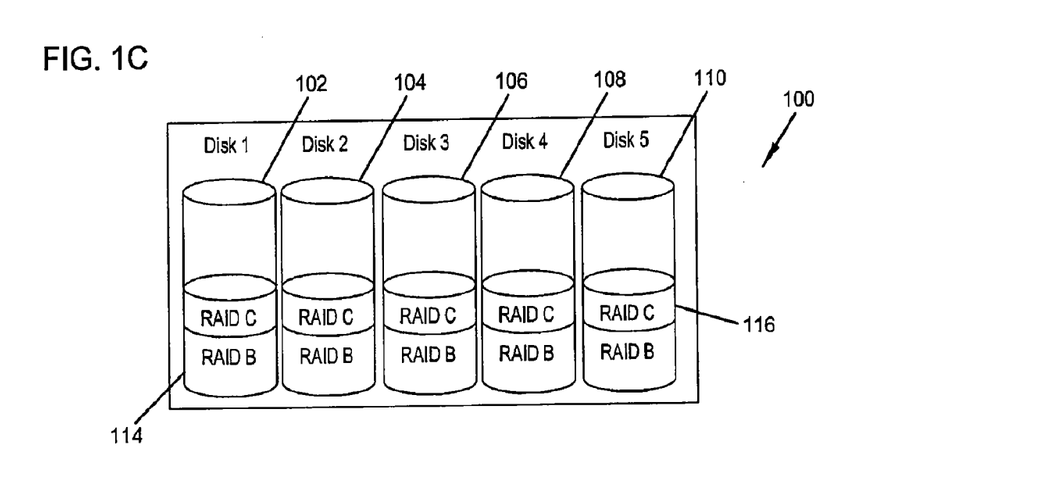
FIG. 1C is the disk array of FIG. 1B after removing a RAID Device.

When the migration is complete, RAID Device A 112 may be deleted, leaving the example RAID configuration shown in FIG. 1C.

The exemplary RAID reconfiguration from that of FIG. 1A to that of FIG. 1C also demonstrates the ability to move portions of Virtual Volumes. That is, in one embodiment, rather than moving an entire Volume, portions of one or more Virtual Volumes may be migrated. This may be accomplished because a single Virtual Volume may be allocated across a plurality of RAID Devices. Similarly, the example configuration demonstrates the ability to move groups of Virtual Volumes since pages migrated from one RAID Device to another RAID Device may be allocated to a plurality of Virtual Volumes.

Adding Disk Drives

Figure 2A:
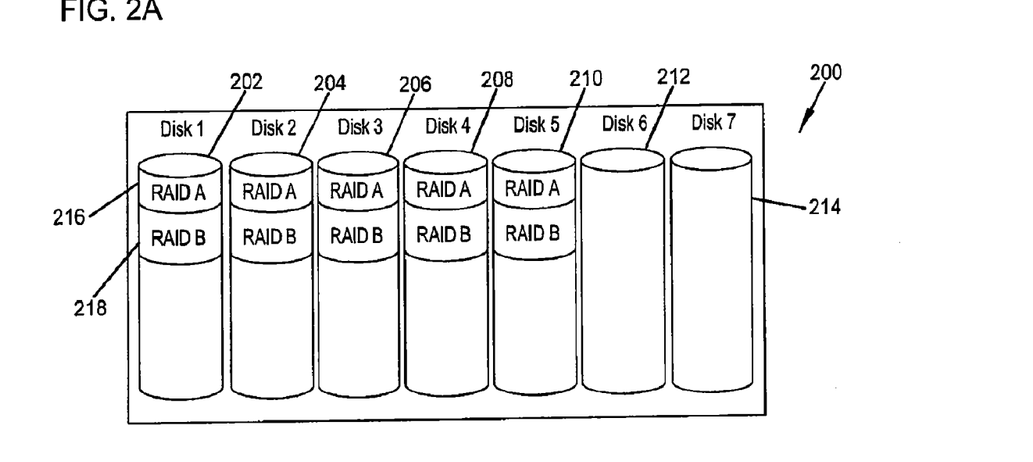
FIG. 2A is a disk array having a RAID configuration in accordance with another embodiment of the present invention.
Figure 2B:
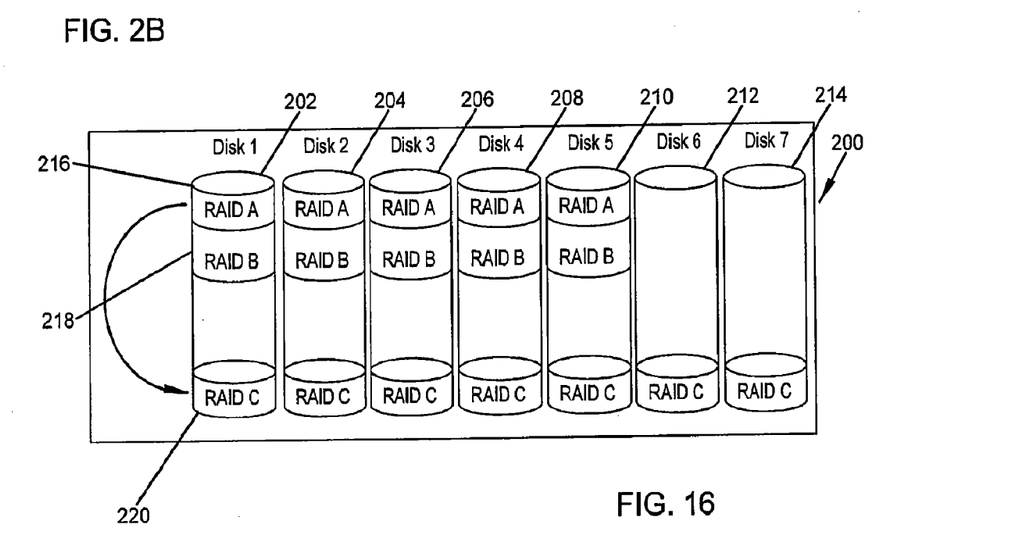
FIG. 2B is the disk array of FIG. 2A having an additional RAID Device.
Figure 2C:
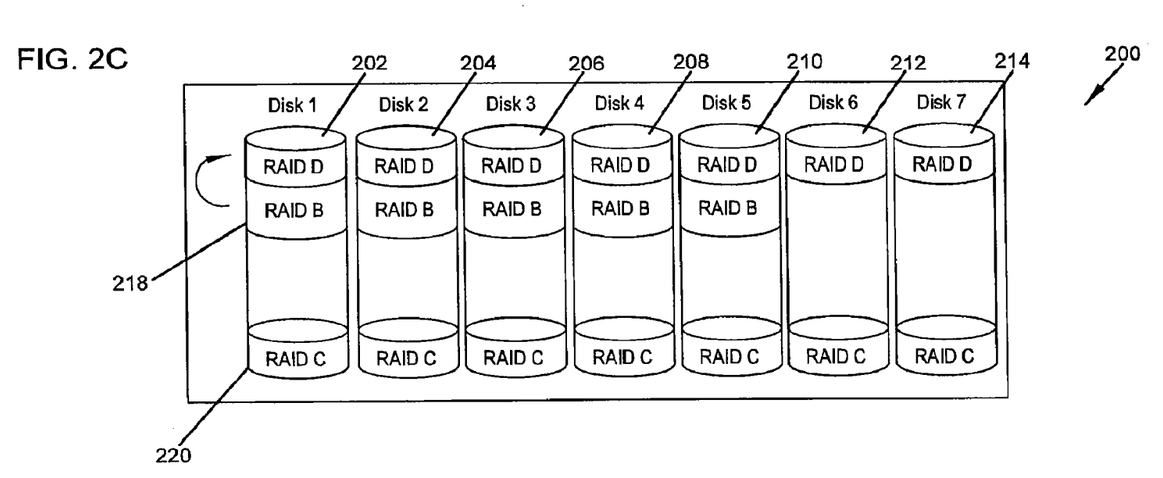
FIG. 2C is the disk array of FIG. 2B after removing a RAID Device and adding another RAID Device.

Another embodiment having a disk array 200 containing five disks 202, 204, 206, 208, 210 is illustrated in FIG. 2A, where two additional disk drives 212, 214 have been added to an existing configuration. It is recognized that any number of disks may be used in accordance with the various embodiments disclosed herein, and an exemplary five disk system has been randomly chosen for purposes of describing one embodiment. Similarly, it is recognized that any number of disks may be added in accordance with the various embodiments disclosed herein, and an exemplary two additional disks have been randomly chosen for purposes of describing one embodiment. In some embodiments, it may be desirable to reconfigure the system and spread the RAID Devices across all seven disks. However, it is recognized that the reconfigured RAID Devices do not need to be spread across all available disks. In an embodiment where the RAID Devices are spread across a plurality of disks, the total throughput of the system can be increased by utilizing more hardware in parallel. Additionally, RAID Device layout constraints may result in more efficient use of the additional disks. In particular, RAID 5 typically may require a minimum number of independent disks in order to provide resiliency. Commonly encountered RAID 5 implementations may require a minimum of five disks. Thus, it may be desirable to migrate the pages from both RAID Devices A 216 and B 218, for example, to suitable replacements that span all seven disks. A possible sequence for reconfiguration is shown in FIGS. 2B-D.

In this sequence, the wider RAID Device C 220 may be created and data from RAID Device A 216 may be migrated to RAID Device C 220. RAID Device A 216 may then be deleted, and RAID Device D 222 may be created. RAID Device D 222 may be used to relocate the data previously contained in RAID Device B 218.

In doing so, the only extra space needed on the original disk drives may be that required to create RAID Device C 220. In one embodiment of the example illustration, in the case wherein no other RAID parameter changes, each extent of RAID Device C 220 may be 5/7 the size of the extent size (i.e., RAID Device C is spread among 5 initial drives+2 additional drives) used in constructing RAID Device A 216.

Figure 2D:
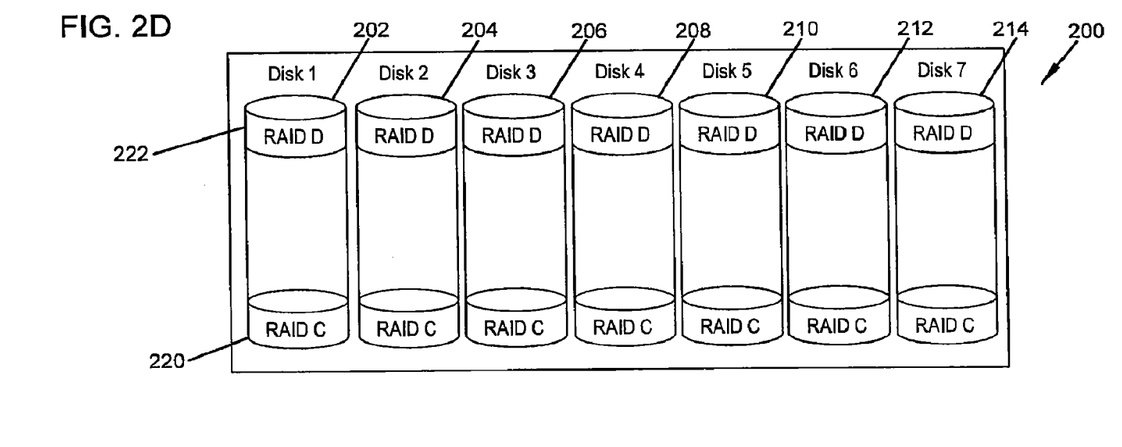
FIG. 2D is the disk array of FIG. 2C after removing yet another RAID device.

It is noted that the process may be entirely reversible and can be used to remove one or more disk drives from a system, such as, for example, if it was desired that disks 212 and 214 be removed from the example configuration of FIG. 2D. Similarly, multiple initial RAID Devices may be migrated to a single RAID Device, or a fewer number of RAID Devices (see e.g., FIG. 3C). Furthermore, a single initial RAID Device may be migrated to a plurality of new RAID Devices (see e.g., FIG. 3B).

The previous example of one embodiment described with reference to FIGS. 2A-D demonstrates the ability to migrate data across additional disks when unused space exists on the original disk set. In some embodiments, however, there may be insufficient disk space to migrate, remove, etc. a RAID Device. Nonetheless, it may be possible to migrate data to additional disks. In such a case, disk space may be reallocated to provide the extra space needed to perform the move. If the Replacement Score, described in detail below, of a RAID Device is higher than the initial Score, a permanent RAID Device of equal size may be allocated. No additional decisions may be required. If the Overlay Score, described in detail below, of a RAID Device is higher than the initial Score, temporary space may be used. This process is detailed for one embodiment having a disk array 300 containing four disks 302, 304, 306, 308 with reference to FIGS. 3A-E, where a multi-step migration is used. Three disks 310, 312, 314 have been added to the disk array 300. It is recognized that any number of disks may be used in accordance with the various embodiments disclosed herein, and an exemplary four disk system has been randomly chosen for purposes of describing one embodiment. Similarly, it is recognized that any number of disks may be added in accordance with the various embodiments disclosed herein, and an exemplary three additional disks have been randomly chosen for purposes of describing one embodiment.

Figure 3A:
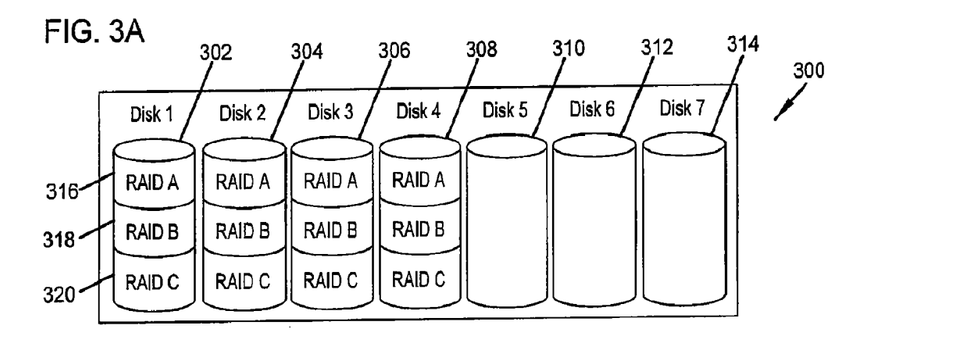
FIG. 3A is a disk array having a RAID configuration in accordance with a further embodiment of the present invention.
Figure 3B:
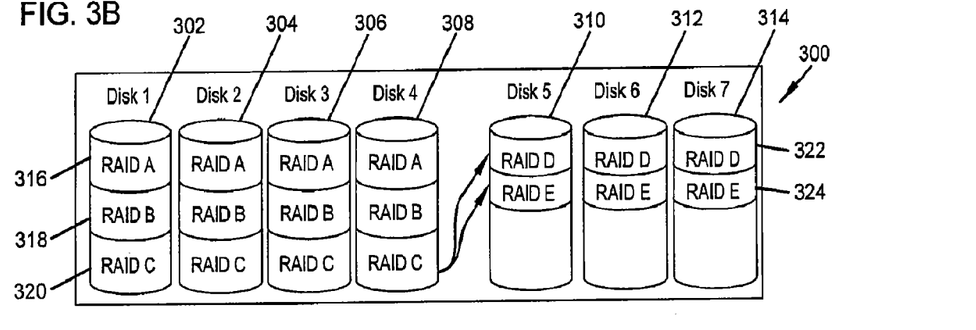
FIG. 3B is the disk array of FIG. 3A illustrating migration of a RAID Device.

The strategy for reconfiguring the system shown in FIG. 3A to make use of all the available disk drives in the array may include creating a temporary RAID Device or temporary RAID Devices and migrating the data from RAID Device C 320, for example, away from the original disk drives to temporary RAID Devices D 322 and E 324, for example. Temporary RAID Devices may be used in such cases where the original disk set is at, or near, capacity. In alternate embodiments, the temporary space may not need to be allocated as RAID Devices and may be used in any manner known in the art for suitably holding data. Similarly, although two temporary RAID Devices D 322 and E 324 are illustrated, it is recognized that a fewer or greater number of temporary RAID Devices may be utilized.

In one embodiment, a data progression process may manage the movement of data between the initial RAID Device and the temporary RAID Device(s), or in other cases, new permanent RAID Device(s). In further embodiments, Restriping may attempt to use the same RAID level, if available. In other embodiments, Restriping may move the data to a different RAID level.

The size of a temporary RAID Device may depend on the initial RAID Device size and available space within a page pool. The size of the temporary RAID Device may provide sufficient space, such that when the initial RAID Device is deleted, the page pool may continue to operate normally and not allocate more space. The page pool may allocate more space at a configured threshold based on the size of the page pool.

Once the data has been migrated away from RAID Device C 320, it can be deleted, providing space for a new RAID Device spanning all of the disk drives, e.g., RAID Device X 326. Deleting RAID Device C 320 may return the disk space RAID Device C 320 consumed to the free space on the disk. At this point, a disk manager may combine adjacent free space allocation into a single larger allocation to reduce fragmentation. Deleting a RAID Device may create free space across a larger number of disks than was previously available. A RAID Device with a higher Score can be created from this free space slice.

Figure 3C:
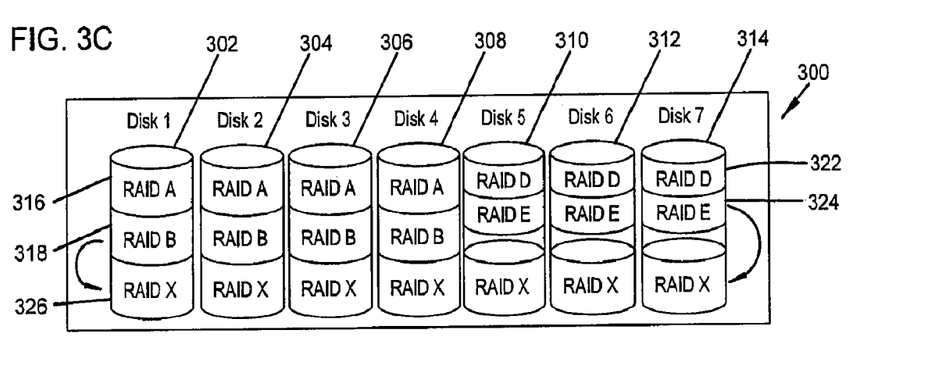
FIG. 3C is the disk array of FIG. 3B illustrating further migration of multiple RAID Devices.

After the initial RAID Device C 320 is deleted, Restriping may create a replacement RAID Device X 326, as shown in FIG. 3C. In one embodiment, replacement RAID Device X 326 may use as many disks as possible to maximize the benefits of virtualization. Restriping may attempt to allocate a RAID Device larger than the initial RAID Device. In a further embodiment, Restriping may do this using a calculation of the Replacement or Overlay Score divided by the initial Score multiplied by the size of the initial RAID Device. This may create a RAID Device that uses the same amount of disk space per disk as before and may reduce fragmentation of the disk.

Figure 3D:
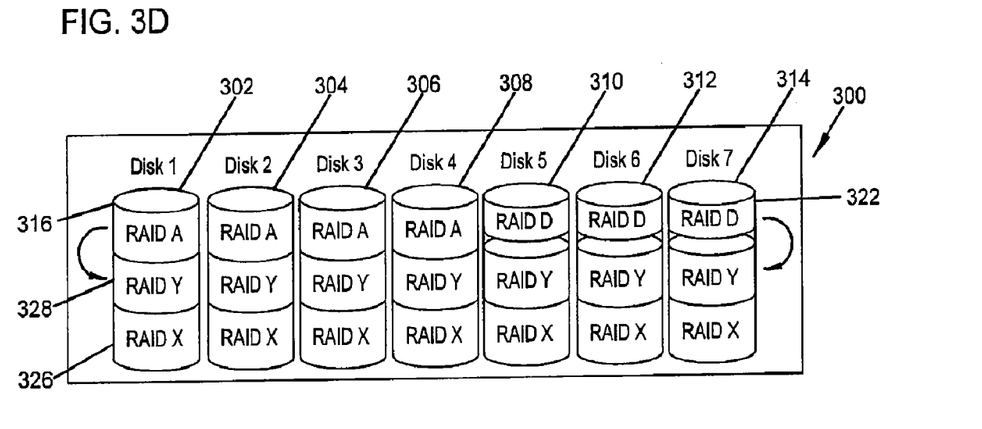
FIG. 3D is the disk array of FIG. 3C illustrating yet further migration of multiple RAID Devices.
Figure 3E:
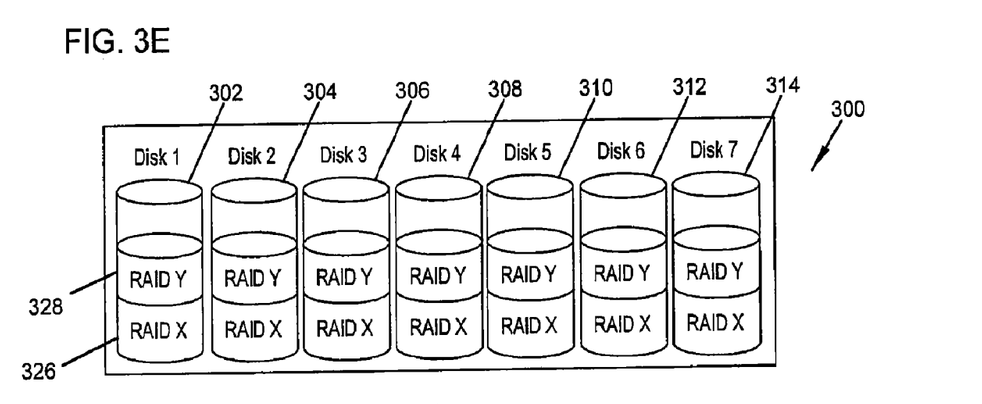
FIG. 3E is the disk array of FIG. 3A in a new RAID configuration.

By judiciously limiting the size of the initial RAID Devices, e.g., RAID Devices A 316, B 318, and C 320, it may be possible to create RAID Device X 326 such that it can hold all the data from RAID Devices B 318 & E 324, for example, allowing the process to continue until the final configuration is achieved in FIG. 3E. That is, RAID Device Y 328 may be created, RAID Devices A 316 and D 322 may be migrated to RAID Device Y 328, and RAID Devices A 316 and D 322 may be deleted.

If a temporary RAID Device or temporary RAID Devices, e.g., RAID Devices D 322 and E 324, were created and marked as temporary, the RAID Devices may be marked for removal, as shown in FIG. 3C-E. In an embodiment, as a part of each cycle, the temporary RAID Devices may be removed. As larger replacement RAID Devices are created, the amount of temporary space needed may decline. It is noted again that in some embodiments, a RAID Device migration may not require the allocation of temporary space to migrate or remove the data.

In one embodiment of Restriping, removal of the temporary RAID Devices may use a subset of the steps used for migration or removal of the initial RAID Device, such as the movement of data and deletion of the temporary RAID Devices.

In one embodiment, if the Score of a temporary RAID Device exceeds the Score of the initial RAID Device, the temporary RAID Device may be considered a permanent RAID Device. That is, it may not be automatically deleted as a part of the process to move a RAID Device. In further embodiments, the temporary RAID Device may be kept only if it has a sufficiently higher Score than the initial RAID Device.

Restriping may involve a number of further steps to remove an original low-scoring RAID Device and replace it with a new higher-scoring RAID Device. For example, Restriping may account for the possibility that the disks in the system are full, and have no space for another RAID Device. Restriping may trim excess space before attempting to restripe a RAID Device. Trimming excess space may free up additional disk space and increase the success rate of Restriping.

In some embodiments, Restriping may reach a deadlock. For example, the size of the temporary space may consume a portion of the space needed to move the initial RAID Device. If it becomes impossible to remove a RAID Device because all pages cannot be freed, the RAID Device may be marked as failed, and Restriping may move on to the next RAID Device that can or should be migrated.

Figure 4:
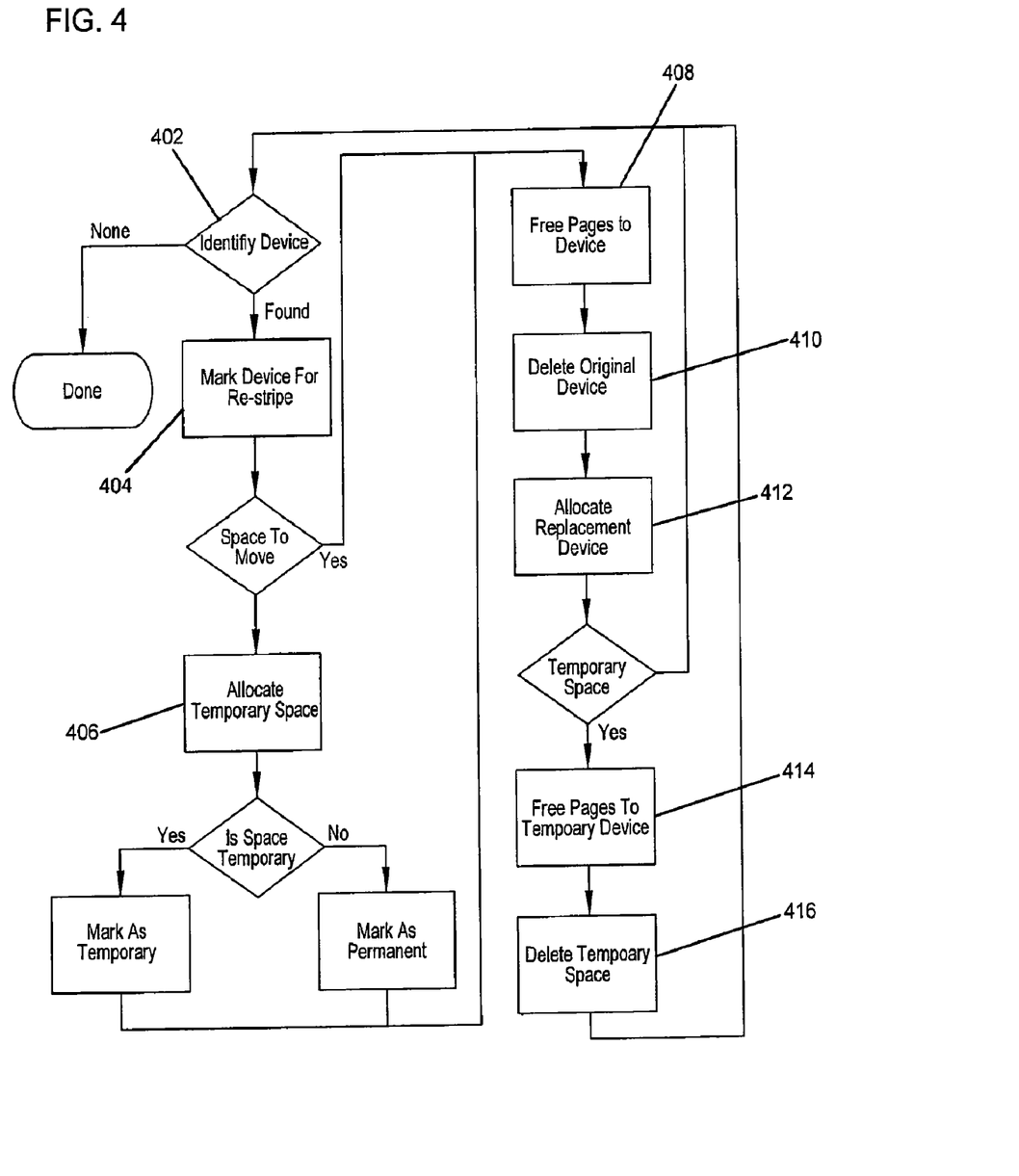
FIG. 4 is a flow chart of a process of Restriping in accordance with one embodiment of the present invention.

With reference to FIG. 4, a flow chart of one embodiment of a process 400 of Restriping is described. It is recognized that FIG. 4 illustrates one embodiment, and various alternative embodiments and processes may be used in accordance with the present disclosure. First, as shown in steps 402 and 404, Restriping may determine whether there is a RAID Device that should or can be migrated, removed, etc. In one embodiment, Restriping may check all of the RAID Devices within a system and select the smallest RAID Device with the lowest relative Score. In other embodiments, Restriping may select other RAID Devices, and Restriping, as described herein, is not limited to selecting the smallest RAID Device and/or the RAID Device with the lowest Score. Generally, however, if movement of the smallest RAID Device fails, a larger RAID Device may likely not succeed either. In an embodiment, the lowest scoring RAID Device may be determined by dividing the Replacement or Overlay Score by the initial Score. Other methods of determining the lowest scoring RAID Device are in accordance with the present disclosure, including using solely the initial Score of the RAID Devices.

In addition to identifying RAID Devices for migration or removal, as shown in FIG. 4, RAID Device movement may include a plurality of steps to optimize the RAID configuration, such as, but not limited to, allocating temporary space (step 406), moving data (step 408), deleting the original RAID Device (step 410), allocating a new RAID Device (step 412), and/or deleting the temporary RAID Device (steps 414 and 416). The foregoing listing of additional steps is exemplary and RAID Device movement need not require each of the listed steps, and in some embodiments, may include further or different steps than those listed. For example, in some embodiments, temporary space may not be used, and therefore, may not be allocated.

In some embodiments, Restriping may limit the movements of RAID Devices. For example, to avoid thrashing the system, Restriping may not need to absolutely maximize the Score of a RAID Device. Restriping may also mark failed RAID Devices so as not to retry them.

Figure 5:
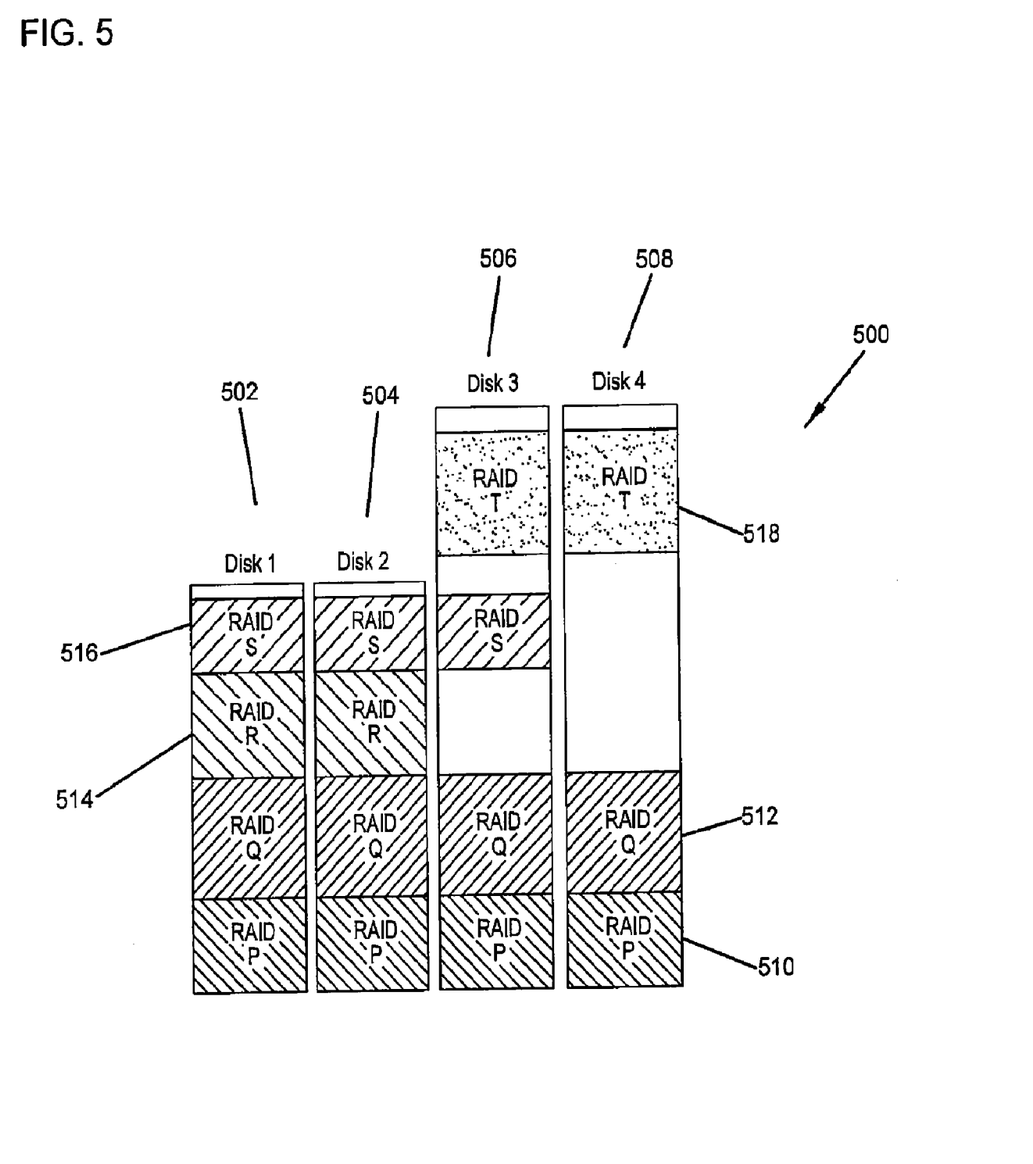
FIG. 5 is a disk array having a RAID configuration with different-sized RAID Devices in accordance with one embodiment of the present invention.

Restriping may recognize new disks, create new RAID devices which utilize the additional spaces, and move the data accordingly. After the process is complete, user data and free space may be distributed across the total disk drives, including the initial disks and the additional disks. It is noted that Restriping may replace RAID Devices rather than extend them. It is appreciated that the positioning of free space and user allocations on any given disk may be arbitrary, and the arrangements shown in FIGS. 1-3, as well as the remaining FIG. 5, are for illustration purposes.

Selection of RAID Device for Restriping

In one embodiment, as previously discussed, Restriping may handle:

Adding Drives—When additional drives are added to the disk drive system, Restriping may identify RAID Devices that use a sub-optimal number of drives. New RAID Devices may be created and the data may be moved. The original RAID Devices may be eliminated.

Removing Drives—Restriping may detect when disk drives have been marked for removal. RAID Devices which reside on these drives may become candidates for removal, which may be accomplished in a substantially similar manner as for Adding Drives.

RAID Parameter Changes—RAID Parameters, such as RAID level, number of disks within a stripe, and extent size, may be altered by the user to improve performance. Restriping may compare the desired parameters against the initial parameters and select nonoptimal RAID Devices for migration and/or removal.

In some embodiments, including embodiments having larger, more complicated systems, it may not be obvious which set of migration operations should be used in order to obtain the desired final configuration or if it is possible to get from the initial configuration to the final desired configuration within the existing resources. In one embodiment, a scoring and optimization technique may be used to select the particular RAID Device for removal and replacement. The scoring function, in an exemplary embodiment, may employ one or more of the following properties:

RAID Devices which span more disk drives may be preferred.

RAID Devices which are constructed on a homogeneous set of disk drives may be preferred. Disk drives may be categorized in order to support this function and need not be identical to belong to the same category.

RAID Devices which match the parameters (RAID level, stripe size, disk region, etc.) of the desired final configuration may be preferred.

RAID Devices which place redundant data on physically disparate disk drives may be preferred. An example may include disk drives in separate enclosures, on separate communication paths, or having independent power sources.

In another embodiment, Restriping may be divided into three components, such as scoring, examining, and moving. RAID Device scoring may be used to determine the quality of a given RAID Device based on requested parameters and disk space available. In one embodiment, scoring may generate three values. Restriping may provide a Score for an initial RAID Device and the scores of two possible alternative RAID Devices, referred to herein as the Replacement and Overlay Scores. Details of each score for one embodiment are described below:

Score—The score of the RAID Device in its present state. In one possible embodiment, the Score may be the number of disks used by the RAID Device less fragmentation and parameter issues. See e.g., Table 1. In alternative embodiments, a Score may be calculated in any suitable manner.

Replacement Score—The maximum score of a RAID Device that could be constructed from existing free space. The Replacement Score may be higher than, lower than, or equal to the Score of the RAID Device.

Overlay Score—The maximum score of a RAID Device if the current RAID Device is removed. The Overlay Score may be higher than, lower than, or equal to the Score of the RAID Device. In some embodiments, the Overlay Score may be desired, such as in disk full conditions, to determine if a better RAID Device can be created using the space that is already allocated by the current RAID Device.

With respect to the Replacement and Overlay Scores, the user accessible blocks for the RAID Device may remain the same as the number of disks changes. The three scores may provide the input parameters to develop a strategy for migrating from lower to higher scoring RAID Devices. In a particular embodiment, if the Replacement Score is higher than the initial Score, a straightforward migration like that described in FIGS. 1 and 2 may be possible. If the Overlay Score is better than the initial Score, and if sufficient free space is available for a temporary RAID Device or temporary RAID Devices, then a migration strategy outlined in FIG. 3 may be possible.

In one embodiment, factors used to determine the Scores may include one or more of the following:

Disk Folder—If a RAID Device uses a disk outside of the specified folder, the score of the RAID Device may be lowered. This situation may occur due to administrative action or during sparing, i.e., wherein spare disks may be supplied.

Disk Type—If a RAID Device resides on a disk of the wrong type, the score of the RAID Device may be lowered. This situation may occur if a disk fails and a spare of the appropriate type is not available. In such a case, redundancy may be maintained over 'type purity,' and a spare of another disk type may be used.

Number of Disks Used—In general, wider RAID Devices (e.g., RAID Devices spanning a relatively larger number of disk drives) may be preferred, and the RAID Devices may be given a higher score. In a further embodiment, a maximum width may be considered in order to establish more independent fault domains.

Number of Disks Available—This may be used to determine the Replacement and Overlay Scores of the RAID Device. In one embodiment, disks, excluding spare disks, may be checked for sufficient space to allocate a replacement RAID Device. In other embodiments, spare disks may be included in the determination of the Scores. If space exists; the Replacement and Overlay Score may be increased.

Disk Fragmentation—If free disk space exists around the RAID Device, the RAID Device score may be lowered. This may be an indication to Restriping that by migrating the RAID Device, disk fragmentation may be reduced.

RAID Level—Whether the desired RAID level matches the initial RAID level. This may include the number of disks within a stripe.

RAID Extent Size—Whether the extent size of the desired RAID Device, i.e., blocks per disk, matches the extent size of the initial RAID Device. In one embodiment, a determination based on RAID extent size may only lower the score of the RAID Device.

Table 1 illustrates an example embodiment of scoring factors that may be used. As illustrated in Table 1, the variables may include Disks In Class, Disks In Folder, RAID Level, RAID Repeat Factor, RAID Extent Size, and RAID Drives in Stripe. Disks In Class, as used in the example scoring factors, may be determined by the equation:

(DisksInClass−3*DisksOutOfClass)*DisksInClass-Constant where DisksInClass may be the number of disks used by the RAID Device that are of the proper class, DisksOutOfClass may be the number of disks used by the RAID Device that are not of the proper class, and DisksInClassConstant may be a multiplicative constant value. Disk classes may include, but are not limited to, 15K FC, 10K FC, SATA, etc. For example, if a RAID Device was supposed to use 10K FC disks, but included two SATA disks, the value for DisksOutOfClass would be two. Disks In Folder, as used in the example scoring factors, may be determined by the equation:

(DisksInFolder−3*DisksOutOfFolder)*DisksIn-FolderConstant where DisksInFolder may be the number of disks used by the RAID Device that are in the proper folder of disks, DisksOutOfFolder may be the number of disks used by the RAID Device that are not in the proper folder of disks, and DisksInFolderConstant may be a multiplicative constant value. Disk folders may organize which disks can be used by RAID Devices. Disks may be moved into, and out of, folder objects at any time to change their usage. RAID Level, as used in the example scoring factors, may be zero if the disk is an undesired RAID level. RAID Repeat Factor, RAID Extent Size, and RAID Drives in Stripe may be a computed score of each divided by a factor of two. It is recognized that Table 1 illustrates one embodiment of example scoring factors and one embodiment of how the scoring factors are calculated and used. The example illustrated in Table 1 is for illustration purposes only and is not limiting. Any scoring factors, or group of scoring factors, may be used with the various embodiments disclosed herein. Furthermore, the scoring factors, or group of scoring factors, may be calculated or used in any suitable manner.

TABLE 1

Example RAID Scoring Factors

| Variable | Score |
|---|---|
| Disk In Class | (DisksInClass − 3 * DisksOutOfClass) * DisksInClassContant |
| Disks In Folder | (DiskInFolder − 3 * DisksOutOfFolder) * DisksInFolderConstant |
| RAID Level | Zero if wrong type |
| RAID Repeat Factor | Computed Score divided by two |
| RAID Extent Size | Computed Score divided by two |
| RAID Drives in Stripe | Computed Score divided by two |

In a further embodiment, Restriping may examine the Scores of the RAID Devices to determine which, if any, RAID Devices may be moved. Restriping may move RAID Devices with a score that is lower than either the Replacement or Overlay Scores. That is, in one embodiment, if the Replacement and/or Overlay Score is greater than the initial RAID Device Score the RAID Device may be a candidate to move. In other embodiments, the initial RAID Devices may be selected for migration by any other means, including situations wherein the initial RAID Device Score is higher than the Replacement and Overlay Scores or by manual selection by a user, etc. Restriping may also determine that no RAID Devices should be moved. In a further embodiment, Restriping may pick a single RAID Device from the available RAID Devices to migrate.

If Restriping identifies a RAID Device to move, migration of the RAID Device may occur. In one embodiment, migration may include determining necessary temporary space, movement of data from the RAID Device, cleanup of the initial RAID Device, and elimination of the temporary space. In another embodiment, a dynamic block architecture page pool may use the RAID Devices and handle the movement of data from lower scoring to higher scoring RAID Devices.

In another embodiment, Restriping may further reevaluate the scores of all RAID Devices after every RAID Device migration since the reallocation of disk space may change the Scores of other RAID Devices. In a further embodiment, the scores of all the RAID Devices may be periodically computed. In some embodiments, Restriping may continually compute the Scores of the RAID Devices. In yet another embodiment, the largest gain in score may be used to select a RAID Device for removal and replacement. A hysteresis mechanism may be used to prevent the process from becoming cyclic.

RAID Device scoring may also handle different-sized disk drives. FIG. 5 illustrates an example configuration 500 with different-sized disks 502, 504, 506, 508. Table 2 illustrates an example RAID Device scoring, for the configuration shown in FIG. 5, including the scoring information for the RAID Devices 510, 512, 514, 516, 518 based on the configuration 500. Relative numbers are used for simplicity. Although Table 2 illustrates scores relating to RAID Device candidates for migration, Table 2 is not limiting and any scoring combination may result in marking a RAID Device for migration or no migration.

TABLE 2

RAID Example Scoring

| Device | Score | Replacement | Overlay | Restripe |
|---|---|---|---|---|
| P 510 | 4 | 0 | 4 | No, at maximum |
| Q 512 | 4 | 0 | 4 | No, at maximum |
| R 514 | 2 | 2 | 4 | Yes, 50% of maximum |

TABLE 2-continued

RAID Example Scoring

| Device | Score | Replacement | Overlay | Restripe |
|--------|-------|-------------|---------|----------|
| S 516 | 3 | 1 | 4 | Yes, 75% of maximum |
| T 518 | 2 | 2 | 2 | No, at maximum no space on smaller disks |

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

Although the present invention has been described with reference to preferred embodiments, persons skilled in the art will recognize that changes may be made in form and detail without departing from the spirit and scope of the invention.

We claim:

1. A method of data migration in a disk drive system, comprising the steps of:
   determining an initial score for each of a plurality of data storage devices, the initial score relating to a respective one of the plurality of data storage devices in its present state;
   determining a second score for each of the plurality of data storage devices, the second score relating to a data storage device that could be constructed from storage space in the disk drive system; and
   selecting a data storage device for migration to a new data storage device based on a relative comparison of at least one of the initial score or a combination of the initial score and the second score between each of the plurality of data storage devices, the selected data storage device comprising a data storage device with the worst relative combination of the initial score and the second score.

2. The method of claim 1, further comprising moving data stored at the selected data storage device to the new data storage device and removing the selected data storage device.

3. The method of claim 2, wherein the plurality of data storage devices are RAID devices, and wherein scores are each calculated based on at least one of factors comprising the RAID level, RAID stripe size, RAID extent size, disk category, location on disk, disk enclosure, disk enclosure power supply, and communication path to the disk.

4. The method of claim 3, wherein the factors have varying weights.

5. The method of claim 2, wherein moving data stored at the selected data storage device to the new data storage device further comprises creating at least one temporary data storage device.

6. The method of claim 5, further comprising moving data stored at the selected data storage device to the at least one temporary data storage device and then from the temporary data storage device to the new data storage device.

7. The method of claim 2, wherein the selected data storage device comprises a data storage device with an initial score worse than its second score.

8. The method of claim 2, wherein the selected data storage device comprises a data storage device with the worst relative initial score.

9. The method of claim 1, wherein the initial scores and the second scores are based on RAID parameters of the respective data storage devices.

10. The method of claim 1, wherein the initial scores and the second scores are based on the location of the respective data storage devices on the disk drive system.

11. The method of claim 1, wherein the data storage device that could be constructed from storage space in the disk drive system is a data storage device that could be constructed from existing available space.

12. The method of claim 1, wherein the data storage device that could be constructed from storage space in the disk drive system is a data storage device that could be constructed from a combination of existing available disk space and at least a portion of the disk space taken up by the respective data storage device.

13. A disk drive system, comprising:
   a data storage subsystem; and
   a disk manager having at least one disk storage system controller configured to automatically:
      calculate an initial score for each data storage device of a plurality of data storage devices of the data storage subsystem, the initial score relating to a respective one of the plurality of data storage devices in its present state, and calculate a second score for each data storage device of the plurality of data storage devices of the data storage system, the second score relating to a data storage device that could be constructed from storage space in the disk drive system; and
      select at least one data storage device from the plurality of data storage devices for migration to a new data storage device based on a relative comparison of at least one of the initial score or a combination of the initial score and the second score between each of the plurality of data storage devices, the selected data storage device comprising a data storage device with the worst relative combination of the initial score and the second score.

14. The disk drive system of claim 13, wherein the controller is further configured to move at least a portion of the data stored at the selected data storage device to the new data storage device, and remove the selected data storage device.

15. The disk drive system of claim 13, further comprising a virtual volume allocated across a plurality of the data storage devices.

16. The disk drive system of claim 13, wherein at least one of the data storage devices comprises portions of a plurality of virtual volumes.

17. The disk drive system of claim 13, wherein the data storage device that could be constructed from storage space in the disk drive system is a data storage device that could be constructed from existing available space.

18. The disk drive system of claim 13, wherein the data storage device that could be constructed from storage space in the disk drive system is a data storage device that could be constructed from a combination of existing available disk space and at least a portion of the disk space taken up by the respective data storage device.

19. A method of data migration in a disk drive system, comprising the steps of:
   determining an initial score for each of a plurality of data storage devices, the initial score relating to a respective one of the plurality of data storage devices in its present state;
   determining a second score for each of the plurality of data storage devices, the second score relating to a data storage device that could be constructed from storage space in the disk drive system; and selecting a data storage device for migration to a new data storage device based on a relative comparison of at least one of the initial score or a combination of the initial score and the second score between each of the plurality of data storage devices, the selected data storage device comprising a data storage device with the largest difference between its respective initial and second scores.

20. A disk drive system, comprising:

a data storage subsystem; and a disk manager having at least one disk storage system controller configured to automatically:

calculate an initial score for each data storage device of a plurality of data storage devices of the data storage subsystem, the initial score relating to a respective one of the plurality of data storage devices in its present state, and calculate a second score for each data storage device of the plurality of data storage devices of the data storage system, the second score relating to a data storage device that could be constructed from storage space in the disk drive system; and select at least one data storage device from the plurality of data storage devices for migration to a new data storage device based on a relative comparison of at least one of the initial score or a combination of the initial score and the second score between each of the plurality of data storage devices, the selected data storage device comprising a data storage device with the largest difference between its respective initial and second scores.

* * * * *